US010967915B2

(12) United States Patent
Hashida et al.

(10) Patent No.: US 10,967,915 B2
(45) Date of Patent: Apr. 6, 2021

(54) VEHICLE FRONT PORTION STRUCTURE

(71) Applicant: Toyota Jidosha Kabushiki Kaisha, Toyota (JP)

(72) Inventors: Shigenori Hashida, Toyota (JP); Hyuga Atsumi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/570,449

(22) Filed: Sep. 13, 2019

(65) Prior Publication Data

US 2020/0086926 A1    Mar. 19, 2020

(30) Foreign Application Priority Data

Sep. 18, 2018 (JP) ............................. JP2018-173602

(51) Int. Cl.
| | | |
|---|---|---|
| *B62D 21/03* | (2006.01) | |
| *B60K 11/04* | (2006.01) | |
| *B62D 25/08* | (2006.01) | |
| *B60K 1/00* | (2006.01) | |
| *B62D 21/11* | (2006.01) | |

(52) U.S. Cl.
CPC .............. *B62D 25/084* (2013.01); *B60K 1/00* (2013.01); *B60K 11/04* (2013.01); *B62D 21/03* (2013.01); *B62D 21/11* (2013.01)

(58) Field of Classification Search
CPC .... B62D 25/084; B62D 25/082; B62D 25/08; B62D 21/03; B62D 21/11; B60K 1/00; B60K 11/04; B60K 11/02
USPC .................................................. 180/291, 299
See application file for complete search history.

(56) References Cited

U.S. PATENT DOCUMENTS

| 8,365,858 | B2 * | 2/2013 | Tamagawa | ........... B60R 16/0207 180/291 |
|---|---|---|---|---|
| 8,646,832 | B2 * | 2/2014 | Yamashita | .............. B60R 19/18 296/203.02 |
| 10,220,880 | B2 * | 3/2019 | Ayukawa | ............... B62D 21/11 |
| 2013/0106141 | A1 | 5/2013 | Yamashita | |
| 2015/0251613 | A1 * | 9/2015 | Mori | .................... B62D 21/152 296/187.09 |

(Continued)

FOREIGN PATENT DOCUMENTS

| JP | 2001278126 A | 10/2001 |
|---|---|---|
| JP | 2007137224 A | 6/2007 |

(Continued)

OTHER PUBLICATIONS

U.S. Appl. No. 16/420,170.

*Primary Examiner* — John D Walters
(74) *Attorney, Agent, or Firm* — Dinsmore & Shohl LLP

(57) ABSTRACT

Provided is a vehicle front portion structure including: a right and left pair of front side members that are disposed on both vehicle width direction sides of a vehicle body front portion and extend along the vehicle front and rear direction; a cross member that is disposed between front end portions of the right and left pair of front side members and interconnects the front end portions in the vehicle width direction; a front-wheel-drive motor that is disposed on the vehicle rear side of the cross member; and a radiator that is disposed on the vehicle rear side of the cross member and on the vehicle front side of the motor and extends along the vehicle width direction and the vehicle up and down direction.

6 Claims, 3 Drawing Sheets

(56) References Cited

U.S. PATENT DOCUMENTS

| | | | |
|---|---|---|---|
| 2017/0050676 A1* | 2/2017 | Daigaku | B62D 21/155 |
| 2017/0313361 A1* | 11/2017 | Watanabe | B62D 29/001 |
| 2018/0327031 A1 | 11/2018 | Atsumi | |

FOREIGN PATENT DOCUMENTS

| | | | |
|---|---|---|---|
| JP | 2013095153 A | 5/2013 |
| JP | 2015024779 A | 2/2015 |
| JP | 2017061232 A | 3/2017 |
| JP | 2017217931 A | 12/2017 |
| JP | 2018187987 A | 11/2018 |

* cited by examiner

VEHICLE FRONT PORTION STRUCTURE

CROSS-REFERENCE TO RELATED APPLICATION

This application is based on and claims priority under 35 USC 119 from Japanese Patent Application No. 2018-173602 filed on Sep. 18, 2018, the disclosure of which is incorporated by reference herein.

BACKGROUND

Technical Field

The present disclosure relates to a vehicle front portion structure.

Related Art

Many vehicle front portion structures for cars are known (see Japanese Patent Application Laid-open (JP-A) No. 2013-95153, JP-A No. 2017-217931, JP-A No. 2017-61232, JP-A No. 2007-137224, JP-A No. 2001-278126, and JP-A No. 2015-24779). For example, JP-A No. 2013-95153 discloses a vehicle front portion structure for an electric car. Briefly described, a right and left pair of front side members are disposed on both vehicle width direction sides of a vehicle front portion, and a front bumper reinforcement is attached via crash boxes to front ends of the front side members. Furthermore, a radiator support is disposed on the vehicle width direction inner side of the right and left crash boxes, and cooling system components including a radiator are disposed in a frame of the radiator support. An electrical component unit including a motor is disposed on the vehicle rear side of the radiator. The electrical component unit is disposed on the vehicle upper side of a motor compartment cross member, and the motor compartment cross member bridges longitudinal direction middle portions of the right and left front side members and extends in the vehicle width direction.

According to the above related art, there is the possibility that, at the time of a small overlap crash (i.e., when an impactor such as a barrier frontally impacts the car with a small amount of overlap in the vehicle width direction), the front side members will undergo bending deformation at their portions on the front side of the motor compartment cross member, and there is the possibility that, depending on the configuration of the vehicle front end side for example, a certain impact load will be input to the radiator at the time of a minor collision.

SUMMARY

In consideration of the above circumstances, the present disclosure provides a vehicle front portion structure that can inhibit bending deformation of the front side members at the time of a small overlap crash and can reduce the impact load that is input to the radiator at the time of a minor collision.

A vehicle front portion structure of a first aspect of the disclosure includes: a right and left pair of front side members that are disposed at vehicle width direction sides of a vehicle body front portion, respectively, and that extend along a vehicle front and rear direction; a cross member that is disposed between front end portions of the right and left pair of front side members and interconnects the front end portions in a vehicle width direction; a front-wheel-drive motor that is disposed on the vehicle rear side of the cross member; and a radiator that is disposed on a vehicle rear side of the cross member and on the vehicle front side of the motor, and that extends along the vehicle width direction and the vehicle up and down direction.

According to the above configuration, the front end portions of the right and left pair of front side members are interconnected in the vehicle width direction by the cross member disposed between the front end portions of the right and left pair of front side members. For this reason, when the impact load at the time of a small overlap crash is transmitted to the front side members, bending of the front side members is inhibited because of the support of the cross member. Because of this, the front side members stably undergo axial compressive deformation, and efficient energy absorption occurs. Furthermore, the radiator that extends along the vehicle width direction and the vehicle up and down direction is disposed on the vehicle rear side of the cross member and on the vehicle front side of the motor. Because of this, compared to a contrasting example where, for example, the radiator is disposed in a vehicle front and rear direction position on the vehicle front side of the front ends of the front side members, the impact load that is input to the radiator at the time of a minor collision is reduced.

A vehicle front portion structure of a second aspect of the disclosure has the configuration of the first aspect and further includes a suspension member that is supported in a suspended state by the right and left pair of front side members, wherein the radiator is secured to a top of the suspension member.

According to the above configuration, by securing the radiator to the top of the suspension member before the suspension member is mounted to the vehicle, the radiator becomes mounted to the vehicle front portion by mounting the suspension member to the vehicle front portion.

A vehicle front portion structure of a third aspect of the disclosure has the configuration of the second aspect and further includes a water-cooled condenser that is mounted to the top of the suspension member and is disposed on the vehicle rear side of the radiator and pipes that interconnect the radiator and the water-cooled condenser and extend along the vehicle front and rear direction, as seen in a vehicle side view.

According to the above configuration, even if the suspension member is moved along the vehicle up and down direction toward its assembly position in a state in which the radiator is secured and the water-cooled condenser is mounted beforehand to the top of the suspension member and the radiator and the water-cooling condenser are interconnected by the pipes, the pipes do not hit the cross member. Consequently, it becomes possible to reduce the lengths of the pipes and to interconnect, with the pipes, the radiator and the water-cooled condenser before mounting the suspension member, the radiator, and the water-cooled condenser to the vehicle.

A vehicle front portion structure of a fourth aspect of the disclosure has the configuration of the second or third aspect, wherein electrical components including the motor are mounted to the top of the suspension member.

According to the above configuration, by securing the radiator and mounting the electrical components including the motor to the top of the suspension member beforehand, the radiator and the electrical components can be integrated before they are mounted to the vehicle. Additionally, by mounting the suspension member to the vehicle front portion in this state, it becomes possible to integrally mount the radiator and the electrical components to the vehicle front portion.

As described above, according to the vehicle front portion structure of the disclosure, the vehicle front portion structure has the superior effects that bending deformation of the front side members at the time of a small overlap crash can be inhibited and the impact load that is input to the radiator at the time of a minor collision can be reduced.

BRIEF DESCRIPTION OF THE DRAWINGS

An exemplary embodiment of the present disclosure will be described in detail based on the following figures, wherein.

DETAILED DESCRIPTION

A vehicle front portion structure pertaining to an embodiment of the disclosure will now be described using FIG. 1 to FIG. 3. It will be noted that arrow FR appropriately shown in these drawings indicates a vehicle forward direction, arrow UP indicates a vehicle upward direction, and arrow W indicates a vehicle width direction. Furthermore, an electric car is applied as the vehicle of this embodiment.

Configuration of Embodiment

Figure 1:
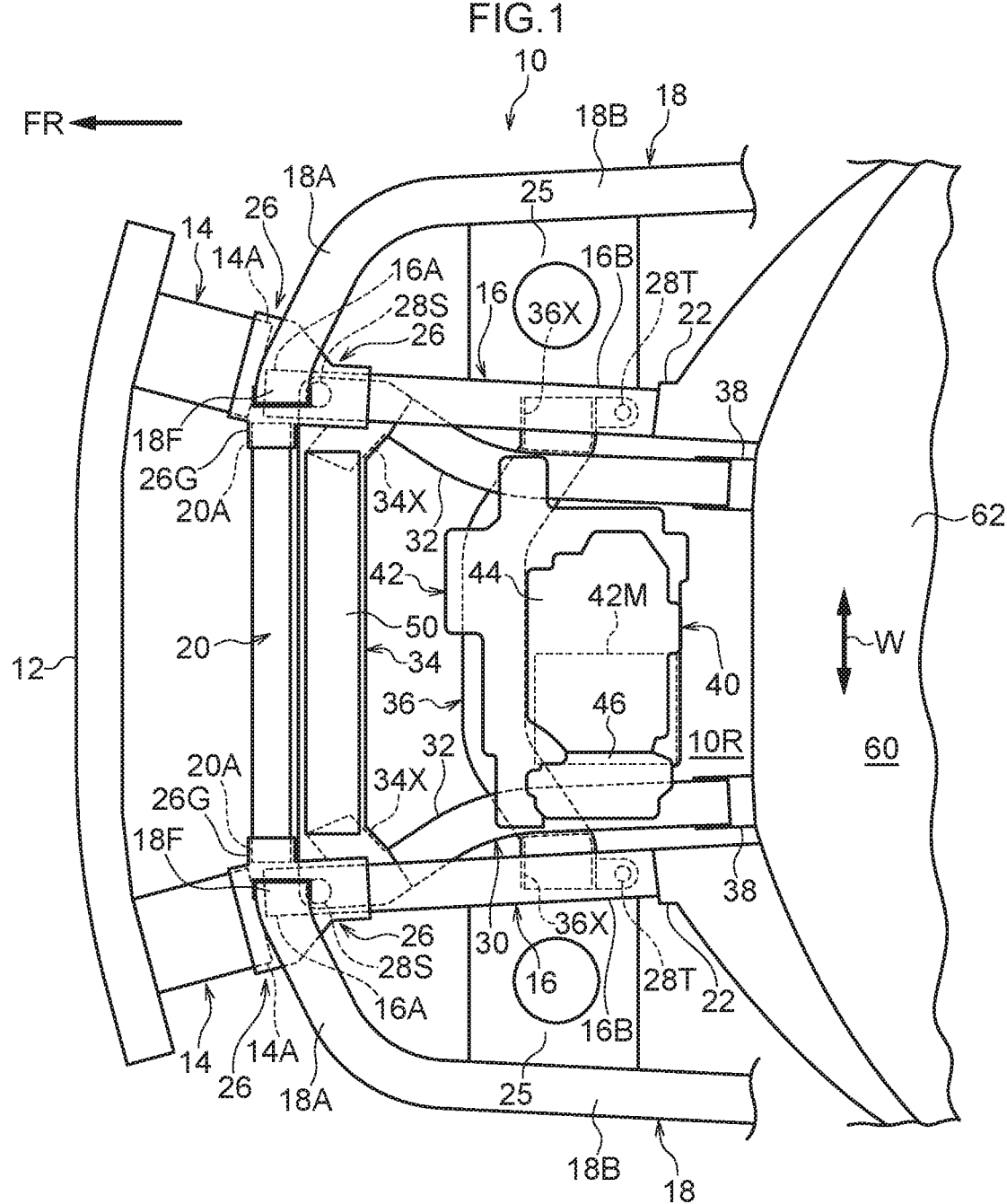
FIG. 1 is a plan view showing a vehicle front portion structure pertaining to the embodiment of the disclosure.

In FIG. 1, the vehicle front portion structure pertaining to the embodiment is shown in a plan view. Furthermore, in FIG. 2, part of the vehicle front portion structure of FIG. 1 is shown in a simplified side view, and in FIG. 3, part of the vehicle front portion structure of FIG. 1 is shown in a schematic perspective view. As shown in these drawings, a bumper reinforcement 12 is disposed on the front end side of a vehicle body front portion 10. The bumper reinforcement 12 extends along the vehicle width direction, and its cross section orthogonal to the vehicle width direction is a closed cross section.

Furthermore, on both vehicle width direction sides of the vehicle body front portion 10, a right and left pair of front side members 16 are disposed on the vehicle rear side of the vehicle width direction outer portions of the bumper reinforcement 12. The front side members 16 extend along the vehicle front and rear direction and in this embodiment are slightly inclined outward in the vehicle width direction heading in the vehicle forward direction. Furthermore, the front side members 16 each have a closed cross-sectional structure whose cross-sectional shape orthogonal to the vehicle front and rear direction is substantially rectangular.

Figure 2:
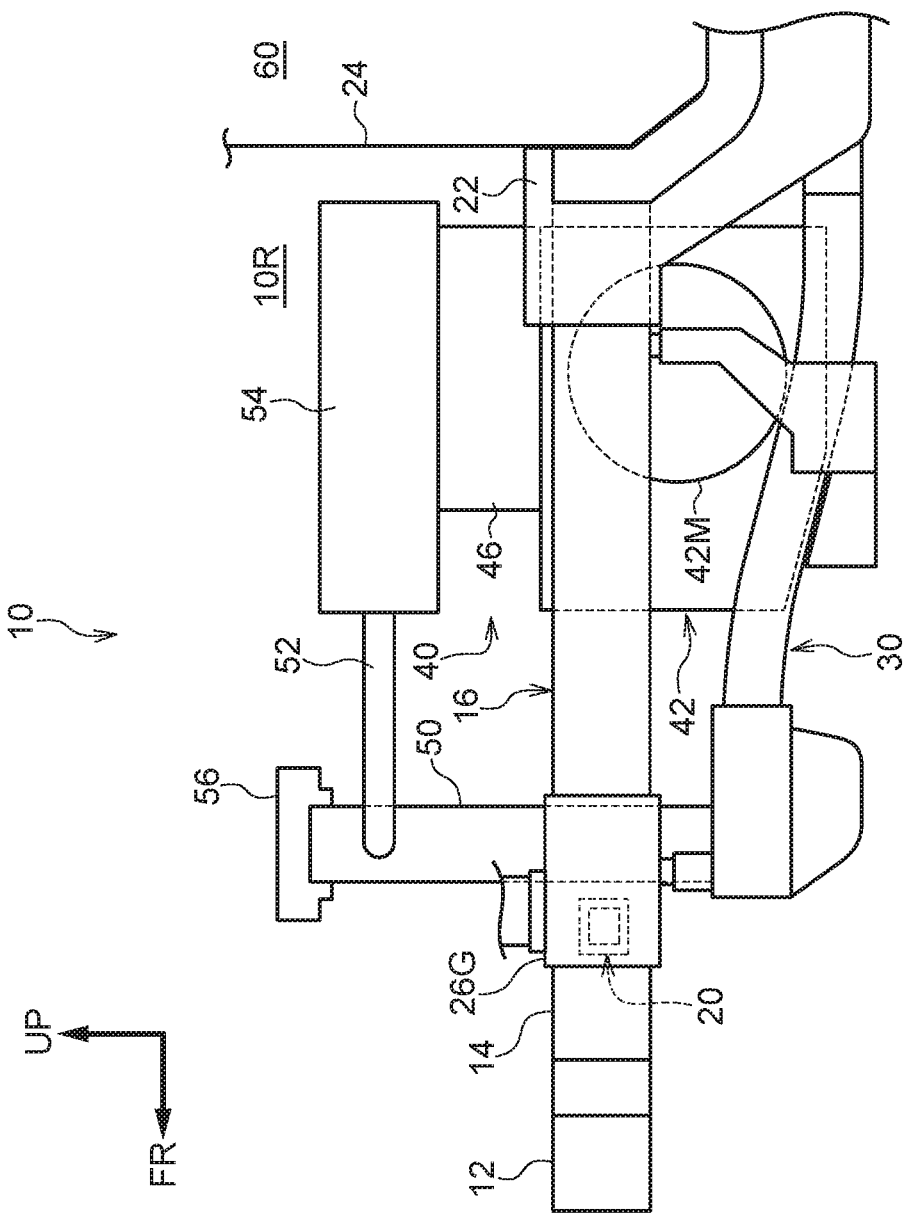
FIG. 2 is a simplified side view showing part of the vehicle front portion structure of FIG. 1.

As shown in FIG. 1 and FIG. 2, the rear end sides of the front side members 16 are joined to front side member rear members 22, and the front side member rear members 22 are joined to a dash panel (vehicle body cabin front wall) 24 shown in FIG. 2. The dash panel 24 partitions a motor compartment 10R from a cabin 60 positioned on the vehicle rear side of the motor compartment 10R.

On the vehicle width direction outer sides and the vehicle upper sides of the front side members 16, rear portions 18B of apron upper members 18 shown in FIG. 1 extend along the vehicle front and rear direction. The apron upper members 18 are formed long, and front portions 18A of the apron upper members 18 extend toward the vehicle lower side while bending inward in the vehicle width direction. The apron upper members 18 are provided as a pair on the right and left like the front side members 16. Front lower end portions 18F of the apron upper members 18 are connected to front end portion 16A sides of the front side members 16, and the rear end portions of the apron upper members 18 are joined to front pillars not shown in the drawings. Suspension towers 25 are provided between the front side members 16 and the rear portions 18B of the apron upper members 18.

Crash boxes 14 are interposed between the bumper reinforcement 12 and the front side members 16. The crash boxes 14 extend along the vehicle front and rear direction and are inclined outward in the vehicle width direction heading in the vehicle forward direction. The crash boxes 14 are configured to undergo compressive deformation in their axial direction when a load equal to or greater than a predetermined value is input thereto from the bumper reinforcement 12.

A cross member 20 is disposed between the front end portions 16A of the right and left pair of front side members 16. The cross member 20 interconnects the front end portions 16A of the right and left pair of front side members 16 in the vehicle width direction together with parts of later-described gussets 26G. The cross member 20 configures part of a frame portion of the vehicle body front portion 10 and has a closed cross-sectional structure whose cross-sectional shape orthogonal to the vehicle width direction is substantially rectangular.

Gussets 26G are disposed in interconnecting portions 26 at which the front side members 16, the apron upper members 18, the crash boxes 14, and the cross member 20 are interconnected. Tubular portions for connection are formed in the gussets 26G. The front end portion 16A sides of the front side members 16, the front lower end portion 18F sides of the apron upper members 18, rear end portions 14A of the crash boxes 14, and vehicle width direction outer end portion 20A sides of the cross member 20 are inserted into and joined to the tubular portions of the gussets 26G. To join the gussets 26G and their joining partners to each other, welding (as an example, FDS® flow drill screws), for example, can be applied.

Body mounts 28S for attaching the front side of a suspension member 30 are secured to undersurface sides of the front end portions 16A of the front side members 16. Furthermore, body mounts 28T for attaching the rear side of the suspension member 30 are secured to undersurface sides of rear portions 16B of the front side members 16. Because of these body mounts 28S and body mounts 28T, both vehicle width direction sides of the suspension member 30 are attached to the undersurface sides of the right and left pair of front side members 16, and the suspension member 30 is supported in a suspended state by the right and left pair of front side members 16 (see FIG. 2).

The suspension member 30 is equipped with side rails 32 that are disposed as a pair on the right and left sides of the suspension member 30 in the vehicle width direction. The suspension member 30 is also equipped with a front cross member 34 and a rear cross member 36 that are disposed as a pair on the front and rear sides of the suspension member 30 in the vehicle front and rear direction. The front cross member 34 and the rear cross member 36 interconnect the right and left pair of side rails 32 in the vehicle width direction. The front cross member 34 is disposed on the vehicle front side of the rear cross member 36.

Lower arm attachment portions 34X, to which suspension lower arms not shown in the drawings are attached, are provided on both vehicle width direction sides of the front cross member 34 in positions on the vehicle width direction inner sides of the side rails 32. Furthermore, lower arm attachment portions 36X, to which suspension lower arms not shown in the drawings are attached, are provided on both vehicle width direction sides of the rear cross member 36 in positions on the vehicle width direction outer sides of the side rails 32.

Furthermore, connection-use members 38 are secured to the rear end portions of the side rails 32. The connection-use members 38 are attached to the front end portion of a battery unit (battery pack) that is not shown in the drawings and is disposed on the vehicle rear side of the connection-use members 38. The battery unit is mounted to the underside of a vehicle floor 62.

Electrical components (which are collectively called an "electrical components group 40" below) including, as an example, a motor unit 42, a power control unit (PCU) 44, and an air conditioner (AC) compressor 46 are mounted to the top of the suspension member 30. The motor unit 42 is equipped with a motor 42M that is a front-wheel-drive drive source, a speed reducer (not shown in the drawings) that is connected to an output shaft of the motor 42M, and a drive shaft (not shown in the drawings) that is connected to a final gear of the speed reducer and transmits drive torque to the front wheels. The electrical components group 40 is disposed away from, on the vehicle rear side of, the cross member 20 in the vehicle body front portion 10. In this embodiment, the electrical components group 40 is disposed in a region set so that the electrical components group 40 does not become crushed at the time of a frontal impact.

Furthermore, a radiator 50 is disposed on the vehicle rear side of the cross member 20 and on the vehicle front side of the motor 42M. The radiator 50 is configured to have a thin substantially cuboidal shape and extends along the vehicle width direction and the vehicle up and down direction. Furthermore, the radiator 50 is for cooling coolant and is secured to the top of the front cross member 34 of the suspension member 30. In this embodiment, as an example, all of the lower portion of the radiator 50 is placed on top of the front cross member 34, but as an example modification, part of the lower portion of the radiator (50) may also be placed on top of, and secured to, the front cross member (34).

As shown in FIG. 2, the upper edge portion of the radiator 50 is secured to, and supported by, a radiator support upper member 56 (not shown in FIG. 1 and FIG. 3) that is an upper support member. The radiator support upper member 56 extends in the vehicle width direction along the upper edge portion of the radiator 50 and is connected to the suspension towers 25 (see FIG. 1) by connecting members such as braces not shown in the drawings as an example. In some embodiments, the side edge portions on both right and left sides of the radiator 50 shown in FIG. 1 may be secured to the front side member 16 sides via vertical pillar-like radiator support side members not shown in the drawings. The right and left pair of radiator support side members may be secured to the top of the front cross member 34 of the suspension member 30. Furthermore, the upper end portions of the right and left pair of radiator support side members may be interconnected by the radiator support upper member 56 (see FIG. 2).

Figure 3:
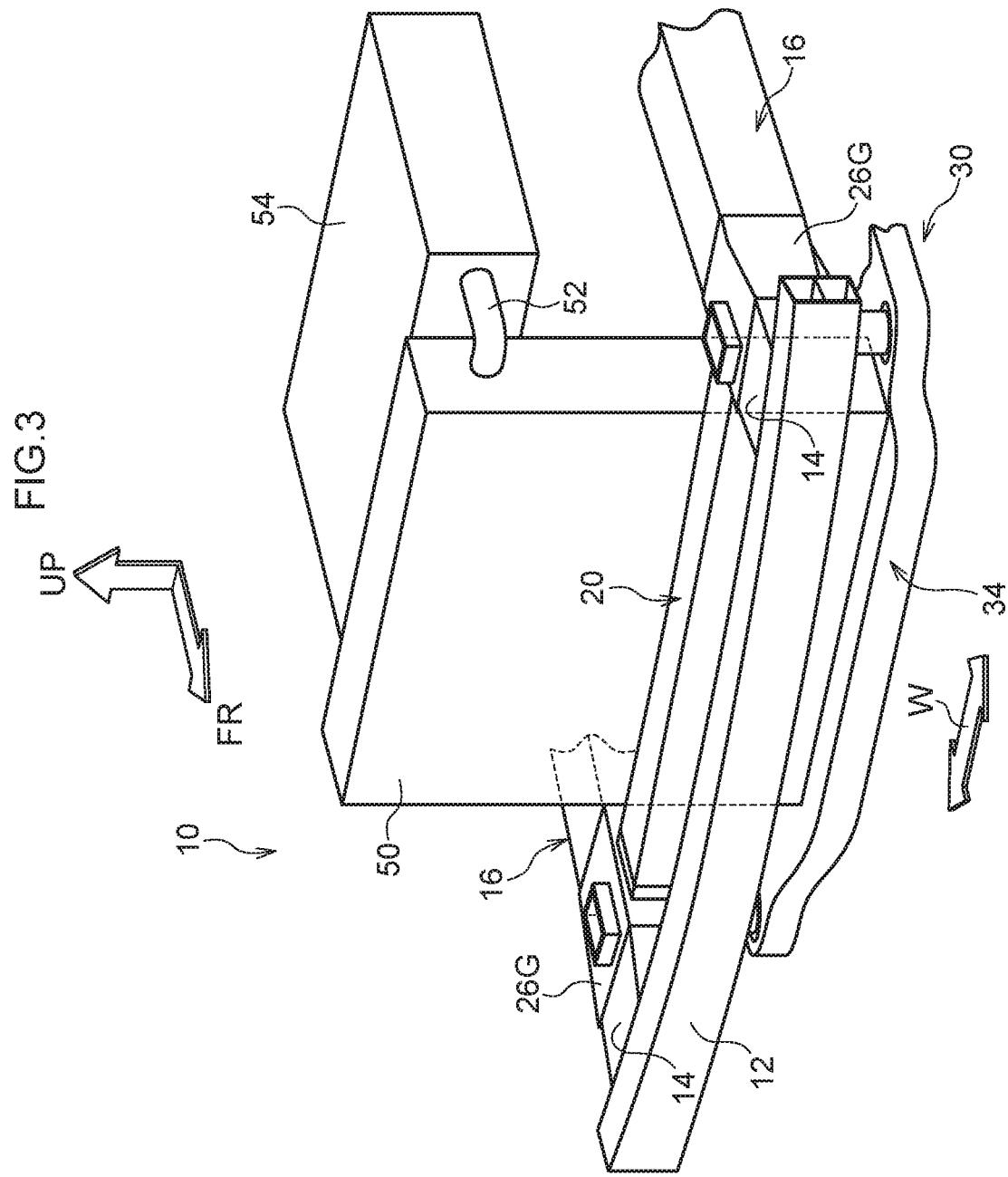
FIG. 3 is a perspective view schematically showing part of the vehicle front portion structure of FIG. 1.

As shown in FIG. 2 and FIG. 3, a water-cooled condenser 54 (not shown in FIG. 1) is disposed on the vehicle rear side of the radiator 50. The water-cooled condenser 54 is mounted to the vehicle upper side of the motor unit 42 (see FIG. 1 and FIG. 2) and, as an example, is secured via a connecting member (not shown in the drawings) to the electrical components group 40 (see FIG. 1 and FIG. 2) such as the motor unit 42. That is, the water-cooled condenser 54 is mounted to the top of the suspension member 30. The water-cooled condenser 54 removes heat from refrigerant compressed in the air conditioner compressor 46 (see FIG. 1 and FIG. 2). The water-cooled condenser 54 and the radiator 50 are interconnected by pipes 52 (not shown in FIG. 1) for circulating the coolant. The pipes 52 extend along the vehicle front and rear direction as seen in a vehicle side view.

The bumper reinforcement 12, the crash boxes 14, the right and left pair of front side members 16, the apron upper members 18, the cross member 20, the front side member rear members 22, the suspension towers 25, the suspension member 30, and the connection-use members 38 that are shown in FIG. 1 to FIG. 3 and have been described above are, in this embodiment, made of metal (e.g., made of an aluminum alloy).

Action and Effects of Embodiment

Next, the action and effects of the embodiment will be described.

In this embodiment, the front end portions 16A of the right and left pair of front side members 16 are interconnected in the vehicle width direction by the cross member 20 disposed between the front end portions 16A of the right and left pair of front side members 16. For this reason, when the impact load at the time of a small overlap crash (a crash where, among frontal impacts to the vehicle, the amount of overlap in the vehicle width direction with the impactor is 25% or less as defined by the IIHS for example) is transmitted to the front side members 16, bending of the front side members 16 is inhibited because of the support of the cross member 20. Because of this, the front side members 16 stably undergo axial compressive deformation, and efficient energy absorption occurs.

In the vehicle body front portion of a car (a conventional car) whose only drive source is an engine, a mounted object of a large size such as the engine is disposed, so practically it is extremely difficult to set in the vehicle body front portion a member corresponding to the cross member 20 of the present embodiment. In contrast, in the case of an electric car as in this embodiment, the size and so forth of mounted objects disposed in the vehicle body front portion 10 are reduced more than in the case of a conventional car, so frame freedom is greater compared to in a conventional car, and the cross member 20 can be set in the vehicle body front portion 10.

Furthermore, in this embodiment, the radiator 50 that extends along the vehicle width direction and the vehicle up and down direction is disposed on the vehicle rear side of the cross member 20 and on the vehicle front side of the motor 42M. Consequently, compared to a contrasting example where, for example, the radiator is disposed in a vehicle front and rear direction position on the vehicle front side of the front ends of the front side members, the impact load that is input to the radiator 50 at the time of a minor collision is reduced.

As described above, according to the vehicle front portion structure of the present embodiment, bending deformation of the front side members 16 at the time of a small overlap crash can be inhibited and the impact load that is input to the radiator 50 at the time of a minor collision can be reduced.

Furthermore, in this embodiment, the radiator 50, which is a heavy object, is close to the center of gravity of the vehicle overall compared to the contrasting example, so the moment of inertia in the yaw direction (a direction about a vertical axis along the vehicle up and down direction) can be reduced and steering stability can be improved.

Furthermore, in this embodiment, the suspension member 30 is supported in a suspended state by the right and left pair of front side members 16, and the radiator 50 is secured to the top of the suspension member 30. In this configuration, by securing the radiator 50 to the top of the suspension member 30 before the suspension member 30 is mounted to the vehicle, the radiator 50 becomes mounted to the vehicle front portion by mounting the suspension member 30 to the vehicle front portion. Furthermore, dedicated parts for supporting the radiator 50 from its undersurface side can be reduced, so the weight of the vehicle can also be reduced.

Furthermore, in this embodiment, even if the suspension member 30 is moved along the vehicle up and down direction toward its assembly position in a state in which the radiator 50 is secured and the water-cooled condenser 54 is mounted beforehand to the top of the suspension member 30 shown in FIG. 2 and the radiator 50 and the water-cooling condenser 54 are interconnected by the pipes 52, the pipes 52 do not hit the cross member 20. Consequently, it becomes possible to reduce the length of the pipes 52 and to interconnect, with the pipes 52, the radiator 50 and the water-cooled condenser 54 before mounting the suspension member 30, the radiator 50, and the water-cooled condenser 54 to the vehicle.

Furthermore, in this embodiment, as shown in FIG. 1, the electrical components group 40 including the motor 42M is mounted to the top of the suspension member 30. According to this configuration, by securing the radiator 50 and mounting the electrical components group 40 including the motor 42M to the top of the suspension member 30 beforehand, the radiator 40 and the electrical components group 40 can be integrated before they are mounted to the vehicle. Additionally, by mounting the suspension member 30 to the vehicle front portion in this state, it becomes possible to integrally mount the cooling system including the radiator 50 and the water-cooled condenser 54 (see FIG. 2) and the drive system including the motor 42M to the vehicle front portion. Because of this, productivity can be improved.

Supplemental Description of Embodiment

In the above embodiment, the radiator 50 is secured to the top of the suspension member 30, but as an example modification of the above embodiment, a configuration where the radiator is secured only to a member other than the suspension member (30) can also be employed.

Furthermore, in the above embodiment, the water-cooled condenser 54 (see FIG. 2) is mounted to the top of the suspension member 30, but a configuration where the water-cooled condenser (54) is mounted to a member other than the suspension member 30 can also be employed.

Furthermore, in the above embodiment, the electrical components group 40 including the motor 42M is mounted to the top of the suspension member 30, but a configuration where the electrical components group including the motor (42M) is mounted to a member other than the suspension member (30) can also be employed.

The above embodiment and aforementioned multiple example modifications can be appropriately combined and implemented.

An example of the disclosure has been described above, but the disclosure is not limited to what is described above and can also be modified and implemented in a variety of ways, in addition to what is described above, in a range that does not depart from the spirit thereof.

What is claimed is:

1. A vehicle front portion structure comprising:
    a right and left pair of front side members that are disposed at vehicle width direction sides of a vehicle body front portion, respectively, and that extend along a vehicle front and rear direction;
    a cross member that is disposed between front end portions of the right and left pair of front side members and interconnects the front end portions in a vehicle width direction;
    a bumper reinforcement that is disposed on a vehicle front side of the cross member and interconnects the front end portions of the right and left pair of front side members in a vehicle width direction;
    a front-wheel-drive motor that is disposed on a vehicle rear side of the cross member; and
    a radiator that is disposed on the vehicle rear side of the cross member and on a vehicle front side of the motor, and that extends along the vehicle width direction and a vehicle up and down direction.

2. The vehicle front portion structure according to claim 1, further comprising a suspension member that is supported in a suspended state by the right and left pair of front side members, wherein the radiator is secured to a top of the suspension member.

3. The vehicle front portion structure according to claim 2, further comprising:
    a water-cooled condenser that is mounted to the top of the suspension member and is disposed on the vehicle rear side of the radiator; and
    pipes that interconnect the radiator and the water-cooled condenser, and that extend along the vehicle front and rear direction, as seen in a vehicle side view.

4. The vehicle front portion structure according to claim 2, wherein electrical components including the motor are mounted to the top of the suspension member.

5. The vehicle front portion structure according to claim 1, wherein the cross member has a closed cross-sectional structure whose cross-sectional shape orthogonal to the vehicle width direction is substantially rectangular.

6. The vehicle front portion structure according to claim 4, wherein the electrical components are disposed away from, on the vehicle rear side of, the cross member in the vehicle body front portion.

* * * * *